Dec. 26, 1961 G. A. MALEY ET AL 3,015,040

BINARY TRIGGER CIRCUIT

Filed March 1, 1960

INVENTORS
GERALD A. MALEY
WILLIAM W. BOYLE
BY Mitchell & Bechert
ATTORNEYS

United States Patent Office 3,015,040

Patented Dec. 26, 1961

3,015,040

BINARY TRIGGER CIRCUIT

Gerald A. Maley, Poughkeepsie, and William W. Boyle, La Grangeville, N.Y., assignors to International Business Machines Corporation, New York, N.Y., a corporation of New York Filed Mar. 1, 1960, Ser. No. 12,199
9 Claims. (Cl. 307—88.5)

Figures 1, 2:
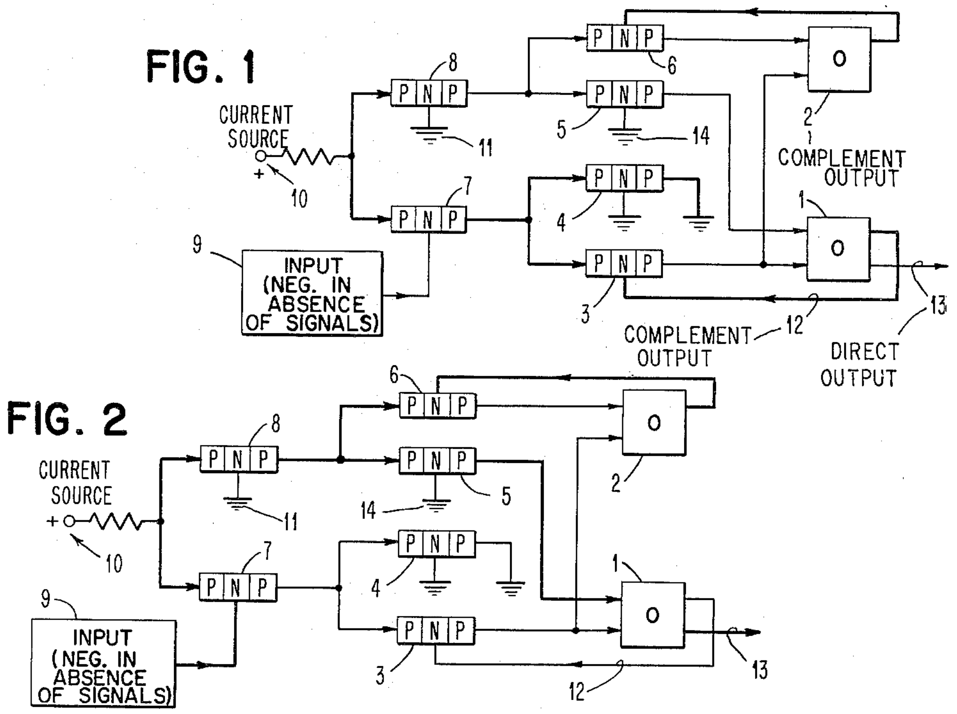

This invention relates to a binary trigger circuit for use in computing apparatus, and more particularly to a trigger circuit comprising transistor logic.

Binary trigger circuits have become well known for their application in computing apparatus. For example, shift registers generally comprise a plurality of stages, each comprising a binary trigger. The binary trigger is capable of being in either of two stable states. In one state the trigger is said to be Off and considered to have a binary "0" stored therein and while in the other state it is said to be On and considered to have a binary "1" stored therein.

It is an object of this invention to provide a novel binary trigger circuit comprising transistor logic, OR circuits and feedback loops to provide the desired triggering action.

In accordance with an aspect of the invention, there is provided first and second OR circuits. A first input circuit is connected to both of the OR circuits. This input circuit is adapted to operate only in the absence of an input signal and in response to the operation of the first OR circuit. Accordingly, one input to both of the OR circuits is normally blocked. A second input circuit is connected to the second OR circuit. This second input circuit is adapted to operate only in the presence of an input signal and in response to the operation of the second OR circuit. Accordingly, the second OR circuit is normally completely blocked. A third input circuit is connected to the first OR circuit. This third input circuit is adapted to operate only in the presence of an input signal and in response to the non-operation of the second OR circuit.

Consequently, in the initial circuit condition, the application of an input signal renders the third input circuit operative and a binary trigger output may be derived from the first OR circuit. This operation of the first OR circuit combined with the removal of the input signal renders the first input circuit operative, thereby to cause the first OR circuit to remain operative. Since the first input circuit is operative, the second OR circuit is also caused to operate. Therefore, upon the application of a second input signal, the second input circuit is rendered operative, thus retaining the second OR circuit operative. As a result, the third input circuit is prevented from operating and the first OR circuit is returned to normal. Removal of the second input signal then returns the complete circuit to its initial condition. This sequence of operations is repeated for the next successive pair of input signals.

The above-mentioned and other features and objects of this invention and the manner of attaining them will become more apparent and the invention itself will be best understood by reference to the following description of an embodiment of the invention taken in conjunction with the accompanying drawing, wherein:

FIGURES 1–4, inclusive, are circuit diagrams of the trigger during four successive conditions of the trigger circuit.

In the figures, the heavy lined connections indicate an Up condition, i.e., a positive condition. The lines of normal thickness indicate a Down condition or the existence of a negative potential on the line.

Referring first to FIGURE 1, the binary trigger circuit is in its initial condition, or sometimes hereinafter referred to as the "normal" condition. The trigger comprises first and second OR circuits 1 and 2; first, second, third and fourth bistable transistors 3, 4, 5 and 6 for providing inputs to the OR circuits 1, 2; transistors 7, 8 adapted to drive one of the transistors 3–6 into operation, and an input source 9 for providing a signal of given polarity to the transistor 7 or a potential of opposite polarity in the absence of a signal.

In the illustration, the transistors are shown as the PNP type. However, it will be obvious to one skilled in the art that NPN transistors may be utilized by making the conventional changes in the biasing circuits.

The transistors 7, 8 are biased by a current source 10, which is capable of driving only one of the two transistors into conduction. Thus, if we assume that the input signal is of positive polarity, and the potential of the input source 9 in the absence of a signal is negative, then in the initial condition a negative potential is applied to the N zone of transistor 7, which, together with the biasing current applied to the input of the transistor, are sufficient to render the transistor conducting. In the presence of a positive signal on the N zone of transistor 7, the ground 11 applied to the N zone of transistor 8 is relatively negative and, therefore, transistor 8 is rendered conducting.

Thus, in the initial state, transistor 7 is conducting and a relatively positive potential is applied to the transistors 3 and 4. The transistors being of the PNP type require for conduction a positive potential on the emitter electrode relative to the base electrode, and a potential on the base electrode which is negative relative to the potential on the collector electrode. The transistor 4 is shown having its output connected to ground. This transistor, therefore, may be replaced by a diode. However in the interests of symmetry and transistor logic, a transistor has been illustrated.

The output of transistor 3 is connected to both OR circuits 1 and 2. The conduction, therefore, of transistor 3 may operate both OR circuits 1 and 2, assuming no input on the other input lead of the OR circuits. In the Off state of transistor 3, however, one input to each of the OR circuits is blocked. The transistor 3 is in effect a bistable element and the state thereof is controlled by feedback connection 12 from the complementary output of the OR circuit 1. The binary trigger output is derived from the OR circuit 1 at 13. In accordance with standard OR circuit connotation, when the actual output is negative, the complementary output is positive and vice versa. Thus, in the absence of a binary trigger output on the line 13, the feedback potential is positive, thereby blocking transistor 3 and blocking one input to each of the OR circuits.

Only the complementary output of the OR circuit 2 is utilized in this embodiment, and is connected in feedback to the base electrode or N zone of transistor 6. An additional feedback connection may be obtained from the lower output of the OR circuit 2 and applied to the transistor 5. This alternative embodiment will be described later.

Thus, in its initial or normal condition, the binary trigger produces no output and the complementary outputs are fed back to transistors 3 and 6, thereby preventing at least transistor 3 (which is biased for conduction) from conducting. The other input to the OR circuit 1 is provided by the transistor 5. However, since there is no driving current on the emitter electrode of this transistor, the transistor is in the non-conducting state.

Referring now to FIGURE 2, upon the application of an input signal to the transistor 7, the transistor 7 is biased to cut-off and, therefore, the transistor 8 is rendered conducting. The output from transistor 8 is applied to the transistors 5 and 6. Since the output of the PNP transistor is relatively positive, the transistors 5 and 6 are biased for conduction. Transistor 6, however, is blocked by the complementary feedback from the OR circuit 2. Transistor 5, therefore, is rendered conducting and the output is applied to the OR circuit 1. The conditions for producing a binary trigger output have now been satisfied in the OR circuit 1 and, therefore, an output is delivered over line 13. The output from the binary trigger indicates that a One has been stored in the trigger, and persists even after the input signal has been removed from the transistor 7. This latter condition is shown in FIGURE 3.

Figure 3:
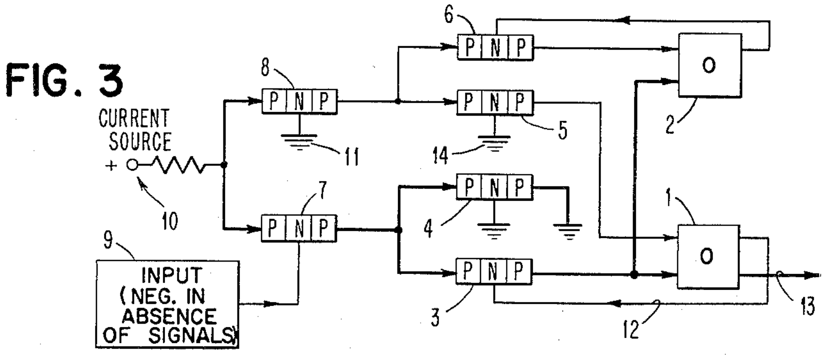

Referring now to FIGURE 3, the absence of an input signal is denoted by a relatively negative potential applied to the line biasing the N zone of transistor 7. The transistor is, therefore, rendered conducting, and again a positive biasing potential is applied to the transistors 3 and 4. However, since the OR circuit 1 is producing a trigger output in a form of a positive signal, the complementary output on the feedback line 12 is negative and applied to the N zone of transistor 3, thereby rendering this transistor conducting. The positive potential at the output of transistor 3 maintains the status of the OR circuit 1 and also reverses the polarity of the complementary output from the OR circuit 2 so that it is now negative.

Figure 4:
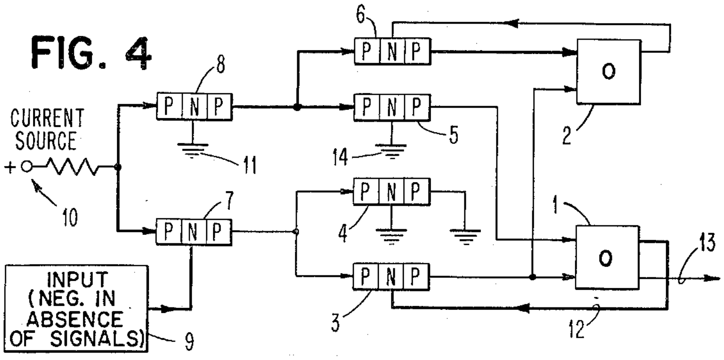

Upon the application of the next input pulse to the transistor 7, the transistor 8 is rendered conducting and the transistor 7 is blocked. This is illustrated in FIGURE 4. Since the OR circuit 2 is now producing a negative potential on the complementary output, which is fed back to the transistor 6, the output from transistor 8 renders transistor 6 conducting and transistor 5 is cut off. Thus, since the transistors 3 and 5, which provide the inputs to the OR circuit 1, are both blocked, the conditions for the OR circuit 1 to produce an output have not been satisfied and, therefore, the binary trigger output on line 13 is terminated.

Upon removal of the input signal to the transistor 7, the binary trigger returns to the initial condition, as shown in FIGURE 1, and the cycle is repeated for succeeding pairs of input signals.

Referring now to the alternative feedback connection mentioned above, instead of omitting the lower output from the OR circuit 2, a feedback connection may be made to the transistor 5. In this modification the ground 14 would be eliminated and the feedback connection would be made directly to the N zone of the transistor. Since the feedback is negative, the transistor 5 would be biased for conduction, so that upon the application of a positive potential to the emitter electrode, the transistor 5 would be rendered conducting. This condition would be the same as that shown in FIGURE 2. The successive conditions are obvious from the illustrations in FIGURES 3 and 4.

While the foregoing description sets forth the principles of the invention in connection with specific apparatus, it is to be clearly understood that this description is made only by way of example and not as a limitation of the scope of the invention as set forth in the objects thereof and in the accompanying claims.

What is claimed is:

1. A binary trigger adapted to produce an output in response to two input signals, comprising first and second OR circuits, each adapted to produce normally a complementary output and one adapted to produce under certain predetermined conditions a trigger output, the complementary and trigger outputs being of opposite polarity, a first gating element adapted to provide an input to each of said OR circuits, a feedback connection coupling said complementary output of said first OR circuit to said first gating element, said normal complementary output being capable of maintaining said gating element in the Off state, whereby one input to each OR circuit is normally blocked, a second gating element adapted to provide another input to the second OR circuit, a second feedback connection from said complementary output of said second OR circuit to said second gating element, said normal complementary output thereof also being capable of maintaining said second gating element in the Off state, whereby another input to said second OR circuit is normally blocked, a third gating element adapted to provide another input to said first OR circuit, whereby a signal passed through said first or third gating element produces said trigger output from said first OR circuit, an input source adapted to produce a signal of given polarity when triggered by an input signal and a potential of opposite polarity in the absence of an input signal, means coupled between said input source and said gating elements and responsive to said signal for passing a signal through said third gating element thereby causing said first OR circuit to produce a trigger output and to reverse the polarity of the complementary output thereof, and said means being responsive to said potential after termination of said input signal to pass a signal through said first gating element while its complementary feedback is of reverse polarity, whereby said trigger output is maintained, and said trigger output being terminated by the application of a second input signal causing said means responsive thereto to terminate the signal passed through said first gating element and to pass a signal through said second gating element, the feedback from said second OR circuit having been reversed by the previous signal passed through said first gating element thereby switching said first and third gating elements to the Off state and terminating the trigger output from said first OR circuit.

2. The trigger according to claim 1, wherein said means coupled between said input source and said gating elements comprise fourth and fifth bistable elements, the fourth gating element being connected to said first gating element and said fifth gating element being connected to said second and third gating elements, said signal passed through said first and second gating elements requiring an On state in the associated fourth and fifth elements respectively and the absence of a normal complementary feedback from said first and second OR circuits, and said signal passed through said third gating element requiring an On state in said fifth gating element and the Off state of said second gating element due to the normal complementary feedback from said second OR circuit.

3. The trigger according to claim 2, wherein each of said gating elements comprises a transistor.

4. The trigger according to claim 3, and further comprising a source of energy coupled to said fourth and fifth transistors, the energy being capable of supporting the conduction of only one of said fourth and fifth transistors at a time, whereby either said first transistor or said second and third transistors are supplied with a signal from said fourth and fifth transistors.

5. The trigger according to claim 4, wherein each of said transistors comprises a PNP type, said source of energy coupled to said fourth and fifth transistors having a positive polarity, said input source being adapted to apply signals of positive potential when triggered by an input signal and a negative potential in the absence of a trigger input signal, whereby in the absence of trigger input signals said fourth transistor is rendered conducting and applies energy to said first transistor, and said normal complementary feedback being positive in potential and applied to the N zone of each said first and second transistors, whereby said positive feedbacks blocks said transistors.

6. A binary trigger adapted to produce an output in response to two input signals, comprising first and second OR circuits, each adapted to produce normally a complementary output of positive potential and said first OR circuits adapted to produce under certain predetermined conditions a trigger output of positive potential, the complementary and trigger outputs being of opposite polarity, a first PNP transistor adapted to provide an input to each of said OR circuits, a feedback connection for said complementary output of said first OR circuit to the N zone of said first transistor, the normal complementary output blocking said transistor, whereby one input to each OR circuit is normally blocked, a second PNP transistor adapted to provide another input to said second OR circuit, a feedback connection for said complementary output of said second OR circuit to the N zone of said second transistor, whereby said second OR circuit is normally blocked, a third PNP transistor adapted to provide another input to said first OR circuit, whereby when said first or third transistor is in the conducting condition said first OR circuit produces said trigger output, an input source adapted to apply a signal of positive potential and in the absence of a signal a potential of negative polarity, a fourth PNP transistor having its N zone connected to said input source and its output coupled to said first transistor, a fifth PNP transistor coupled in bistable relationship with said fourth transistor and having its output coupled to said second and third transistors, a source of energy coupled to said fourth and fifth transistors adapted to render either one of said transistors conducting at a time, whereby in the absence of an input signal when a negative potential is applied to the N zone of said fourth transistor said fourth transistor is conducting and said fifth transistor is blocked, and in the absence of a signal to said fourth transistor, it becomes blocked and said fifth transistor becomes conducting, the conduction of said fifth transistor driving said third transistor into conduction and causing said first OR circuit to produce a trigger output and reverse the polarity of its complementary output, upon the termination of said input signal said fifth transistor is rendered non-conducting thereby blocking said third transistor and said fourth transistor is rendered conducting, the conduction of said fourth transistor driving said first transistor into conduction thereby maintaining the trigger output from said first OR circuit, and said trigger output being terminated by the application of a second input signal to said fourth transistor driving said fifth transistor into conduction, the output from said fifth transistor causing said second transistor to conduct, the feedback from said second circuit having been reversed by the previous conducting condition of said first transistor, whereby said second transistor is biased for conduction and said first and third transistors are blocked thereby terminating the trigger output from said first OR circuit.

7. A binary trigger adapted to produce an output in response to two input signals, comprising first and second OR circuits, and first, second and third input circuits, the output of said first input circuit being connected to both of said OR circuits, the output of said second input circuit being connected to said second OR circuit, the output of said third input circuit being connected to said first OR circuit, said first input circuit being adapted to operate only in the absence of an input signal and in response to the operation of said first OR circuit, said second input circuit being adapted to operate only in the presence of an input signal and in response to the operation of said second OR circuit, said third input circuit being adapted to operate only in the presence of an input signal and in response to the non-operation of said second OR circuit, and the output of said binary trigger being derived from the operation of said first OR circuit.

8. A binary trigger according to claim 7, wherein said first, second and third input circuits each include a separate gating element, biasing means responsive to said input signals and to said first and second OR circuits being coupled to said gating elements to selectively switch said gating elements.

9. A binary trigger according to claim 8, in which said biasing means include a first feedback network from said first OR circuit to the bistable element in said first input circuit, and a second feedback network from said second OR circuit to the bistable element in said second input circuit.

References Cited in the file of this patent

UNITED STATES PATENTS 2,719,228 Auerbach ______________ Sept. 27, 1955